United States Patent
Clancy

(10) Patent No.: US 6,188,894 B1
(45) Date of Patent: Feb. 13, 2001

(54) WIRELESS COMMUNICATION CELL LAYER EVALUATION METHOD

(75) Inventor: James G. Clancy, Plano, TX (US)

(73) Assignee: Ericsson, Inc., Richardson, TX (US)

( * ) Notice: Under 35 U.S.C. 154(b), the term of this patent shall be extended for 0 days.

(21) Appl. No.: 09/193,294

(22) Filed: Nov. 17, 1998

(51) Int. Cl.⁷ .................................................. H04Q 7/36
(52) U.S. Cl. ........................ 455/423; 455/424; 455/67.1; 455/446; 455/449
(58) Field of Search ................................. 455/446, 447, 455/449, 67.1, 63, 450, 423, 561, 522, 424, 448

(56) References Cited

U.S. PATENT DOCUMENTS

| | | | |
|---|---|---|---|
| 5,289,527 | * 2/1994 | Tiedemann, Jr. | 455/435 |
| 5,307,510 | 4/1994 | Gunmar et al. | 455/67.1 |
| 5,490,285 | * 2/1996 | Ahlenius et al. | 455/446 |
| 5,734,983 | * 3/1998 | Faruque | 455/450 |
| 6,006,095 | * 12/1999 | Bernardin et al. | 455/446 |
| 6,052,583 | * 4/2000 | Bernardin | 455/423 |
| 6,081,717 | * 6/2000 | Shah et al. | 455/446 |
| 6,112,091 | * 8/2000 | Van Puuenbroek et al. | 455/446 |

FOREIGN PATENT DOCUMENTS

WO 98/27773   6/1998   (WO) .

* cited by examiner

Primary Examiner—Reinhard J. Eisenzopf
Assistant Examiner—Eliseo Ramos-Feliciano
(74) Attorney, Agent, or Firm—Arthur I. Navarro

(57) ABSTRACT

A method of identifying various cell layers in an existing wireless cellular-type communication system to identify poor performance areas of the system. Various cell layers in an existing system are identified, each layer have an associated cell size. A composite of the various cell layers is visually displayed to reveal poor performance areas which can be utilized as a baseline for further investigation and analysis. The method includes the steps of determining average site-to-site distance between each site and its neighboring sites, and then determining an average cell radius for each site based on the average site-to-site distance. The most predominant cell radius is then identified and used as the anchor base line grid. Each site is then assigned a cell radius which is established by rounding the calculated average cell radius either up or down to a nearest grid size. The grids are displayed using a best-fit algorithm to the existing cell sites and simultaneously displayed to identify poor performance areas of the system. The transmission power of each cell site may be adjusted upwardly or downwardly to achieve a cell radius of coverage commensurate with the assigned cell radius.

22 Claims, 4 Drawing Sheets

AVERAGE SITE-TO-SITE
DISTANCE = 2.87 MILES

SITE-TO-SITE DISTANCE
$2L = \sqrt{3} * R$

SITE-TO-SITE
DISTANCE = 3.0*R

US 6,188,894 B1

WIRELESS COMMUNICATION CELL LAYER EVALUATION METHOD

FIELD OF THE INVENTION

The present invention is generally related to wireless cellular-type communication systems, and more particularly to the evaluation of geographical coverage of the cells and associated cell boundaries to determine poor performance areas.

BACKGROUND OF THE INVENTION

There is desired the ability to geographically identify the various cell layers for an existing wireless communications network, and correspondingly identify geographical areas requiring performance improvement. This method should be applicable to any cellular-type communications network which utilizes base stations geographically spaced in a desired coverage area. The method should be applicable to omni-directional or sectored site configurations. This methodology should also be applied to macrocell, microcell and picocell environments (hierarchical cell structures). A cell layer, in this context, is defined as a grid of hexagons, each hexagon having a "cell" radius, r.

Today, cellular grids are overlaid onto a system during the system design cell planning process and the grid locations are "populated" in order to satisfy coverage and capacity requirements. Generally, hexagons represent the theoretical relations i.e. borders between cells. The system accommodates growth needs by the addition of base stations, which help mitigate interference and capacity problems in the system. Normally, these sites are positioned on "vacant" grid locations.

In order to analyze performance problem areas in an existing cellular-type wireless system, it is necessary to gather customer complaint information and/or switch (MTSO) statistics corresponding to cells (sectors). Drive testing may be necessary in order to validate problems. Cell boundaries are often determined via composite propagation predictions (best server plots).

Due to zoning restrictions and fast system growth, the startup cellular type system grids become "skewed", whereby it is difficult to determine the theoretical boundaries for the cells. Subsequently, cells may not be ideally positioned at the center of the hexagon. The relationship between actual and theoretical cell boundaries is no longer apparent. This leads to performance problems in the system, which can be coverage or interference based. Moreover, when many new base station locations are added to the system, it becomes increasingly difficult to differentiate one grid layer from another. Performance analysis, in turn, becomes cumbersome because cell boundaries associated with various cell layers are near impossible to determine geographically.

It is necessary to provide a methodology, which can be automated, that identifies the various cell layers in an existing wireless system and, accordingly, the cell sizes associated with these layers. A "snapshot" of a cellular-type wireless system should be provided and utilized as a baseline for further analysis of poor performance problems.

SUMMARY OF THE INVENTION

The present invention achieves technical advantages as a cell coverage evaluation method by utilizing existing base station geo-referenced information (latitude/longitude) and determining the average site-to-site distance for each site in the system. Accordingly, utilizing the geometrical relationship between the site-to-site distance and the cell radius, an average cell radius is then calculated for each site in the wireless system based on the average site-to-site distance. The various cell layers (grids) are then identified for the entire system. Cell sizes are determined for each cell (sector) in the system. All cell layers or grids are then overlaid as a "composite" snapshot to reveal poor performance areas (holes) which are utilized as a baseline for further investigation/analysis.

DESCRIPTION OF THE PREFERRED EMBODIMENT

Figure 1:
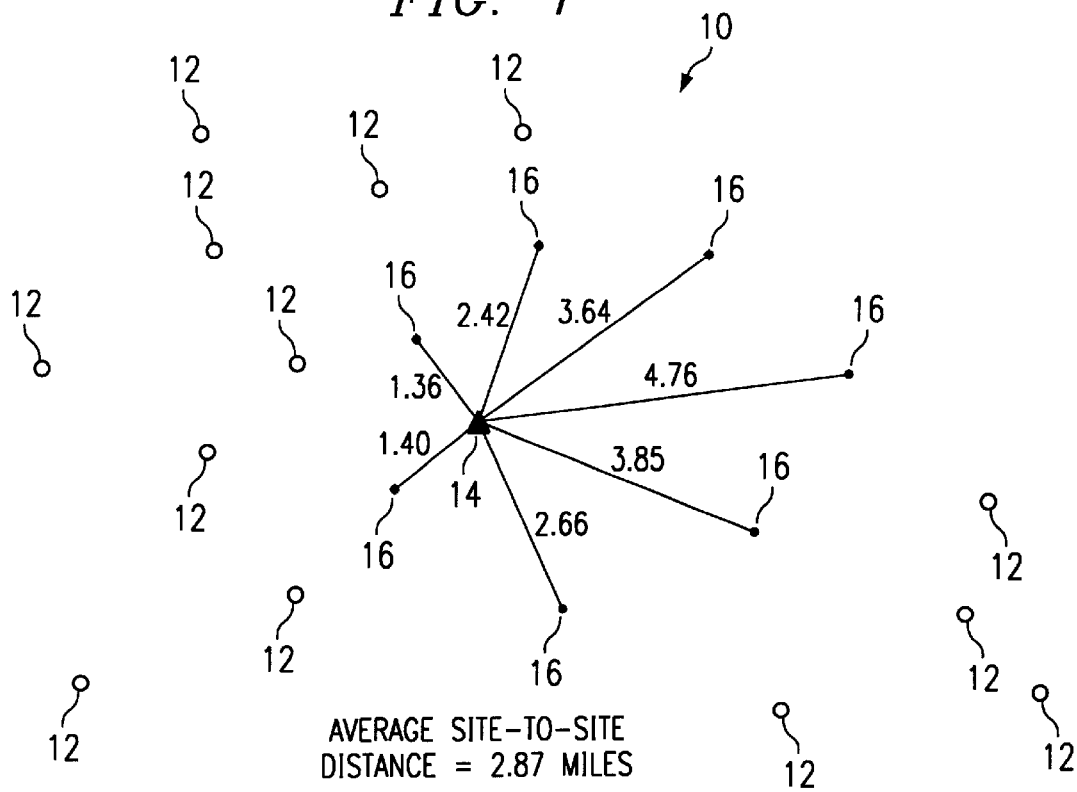
FIG. 1 is an illustration of the geographical distribution of cellular sites located throughout a wireless system depicting the distance between a particular cell site and its associated neighboring sites.

Referring now to FIG. 1, there is shown generally at 10 a wireless communication system including a plurality of geographically referenced cellular sites shown at 12. Each of the sites 12 correspond to an RF transceiver station, such as a base transceiver station (BTS) providing geographical communication coverage with mobile stations (not shown) to be served in the area proximate the respective sites 12. The sites 12 are spaced from one another, and provide RF communication with the mobile stations in proximity to the respective site 12. As shown, the distances between one site 12 and its neighboring sites vary from site-to-site. In addition, the power level of the transmitter associated with each site 12 varies from site-to-site and thus, the effective communication coverage area of each site is different from the next. The coverage area also varies from site-to-site due to variations in geographical terrain, system design, and availability of land to locate cellular sites which all mitigate the ability to design an ideal cellular system. For instance, the cell sites are not necessarily located at the center of the hexagons forming the system grid, and thus, the relationship between actual and theoretical cell boundaries is not readily apparent. According to the methodology of the present invention, poor performance areas in the system can be readily and visually identified and will now be discussed in considerable detail.

The methodology of the present invention first determines the average site-to-site distance for each particular cell site 12 with its neighboring cell sites. This illustrated in FIG. 1 whereby a particular cell site, shown at 14, is seen to be surrounded by neighboring cell sites 16 with the associated distance therebetween being indicated. The neighboring cell sites 16 that qualify as neighboring cell sites is determined based on a number of predetermined factors including geographical proximity, terrain and RF path loss calculations. According to the first step of the present invention, it is known with precision the distance between each cell site 14 and its qualifying neighboring sites 16, these distances being illustratively shown in FIG. 1 for cell site 14. For cell site 14, the average site-to-site distance is 2.87 miles, which is calculated by summing the distances between site 14 and neighboring sites 16, and dividing by the number of neighboring sites.

Referring to Table 1 below there is illustrated the average site-to-site distance for 21 cell sites 12 identified as site A-U comprising cellular-type system 10. Site A corresponds to site 14 in FIG. 1 whereby the average calculated site-to-site distance is 2.87 miles. This average site-to-site calculation is performed for all sites A-U in system 10 and depicted in Table 1 below.

TABLE 1

| SITE | CALCULATED AVE. SITE TO SITE DISTANCE | CALCULATED AVE. CELL RADIUS | ASSIGNED CELL RADIUS |
|---|---|---|---|
| A | 2.87 | 1.66 | 1.5 |
| B | 5.14 | 2.97 | 3.0 |
| C | 6.45 | 3.73 | 3.0 |
| D | 8.63 | 4.99 | 6.0 |
| E | 6.37 | 3.68 | 3.0 |
| F | 6.37 | 3.68 | 3.0 |
| G | 14.55 | 8.41 | 6.0 |
| H | 19.39 | 11.21 | 12.0 |
| I | 15.15 | 8.76 | 6.0 |
| J | 4.88 | 2.82 | 3.0 |
| K | 6.02 | 3.48 | 3.0 |
| L | 3.72 | 2.15 | 1.5 |
| M | 4.45 | 2.57 | 3.0 |
| N | 3.58 | 2.07 | 1.5 |
| O | 3.46 | 2.00 | 1.5 |
| P | 4.76 | 2.75 | 3.0 |
| Q | 3.24 | 1.87 | 1.5 |
| R | 2.80 | 1.62 | 1.5 |
| S | 5.65 | 3.27 | 3.0 |
| T | 7.37 | 4.26 | 3.0 |
| U | 4.74 | 2.84 | 3.0 |

Figure 2:
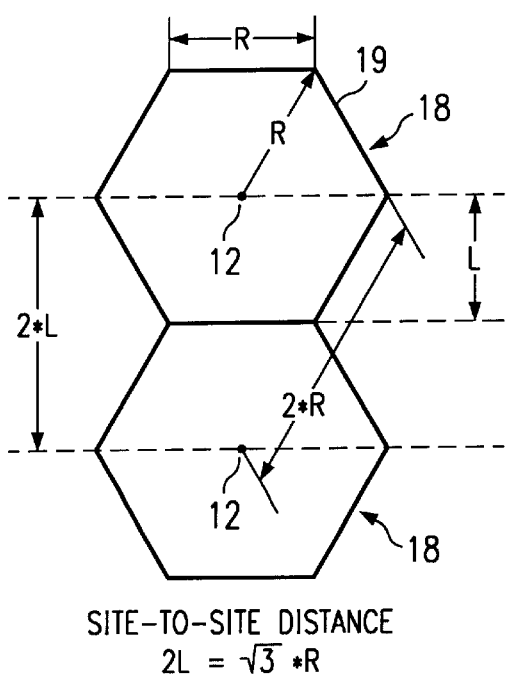
FIG. 2 is an illustration of cells having a hexagonal grid pattern formed in a rhombic pattern, depicting the relationship of the cell radius to the site-to-site distance.

According to the next step of the present invention, the average cell radius of each particular cell associated with sites A-U is determined based on the calculated average site-to-site distance for that particular site. To calculate the average cell radius, it is necessary to ascertain the geometry of the particular cells. With reference to FIG. 2, there is depicted typical cells 18 that form a generally hexagonal grid pattern, with the cells 18 shown in FIG. 2 having rhombic patterns and the sites 12 being at the hexagon centers. In this grid pattern, the site-to-site distance is represented by the distance to 2L, corresponding to the distance between the centers of the hexagons 18, with the centers being shown at 12. Ideally, the base transceiver station (BTS) is geographically located at the center 12. The side or borders 19 of the hexagonal cell 18 in this embodiment has a length R, which is also the cell radius between the cell site center and the apex of the hexagon. In this illustration of a preferred embodiment, the relationship of the cell radius to the site-to-site distance is:

$$R = 2L/\sqrt{3}$$

Thus, knowing the average site-to-site distance (2L) for each site, the average cell radius for each site can be calculated, and is shown in Table 1 above for each of the particular cell sites 12. For purposes of Table 1, it is assumed that the sites 12 of FIG. 1 form coverage areas having rhombic hexagons as depicted in FIG. 2.

The inside of the hexagon may be divided into sectors i.e. sectors A, B, C, each sector being a cell and served by a separate horizontal beam width antenna, a common scenario being three 120 degree sectors. Here, neighboring sites 16 within the 120 degree beamwidth are included in site-to-site distance calculations.

Figure 3:
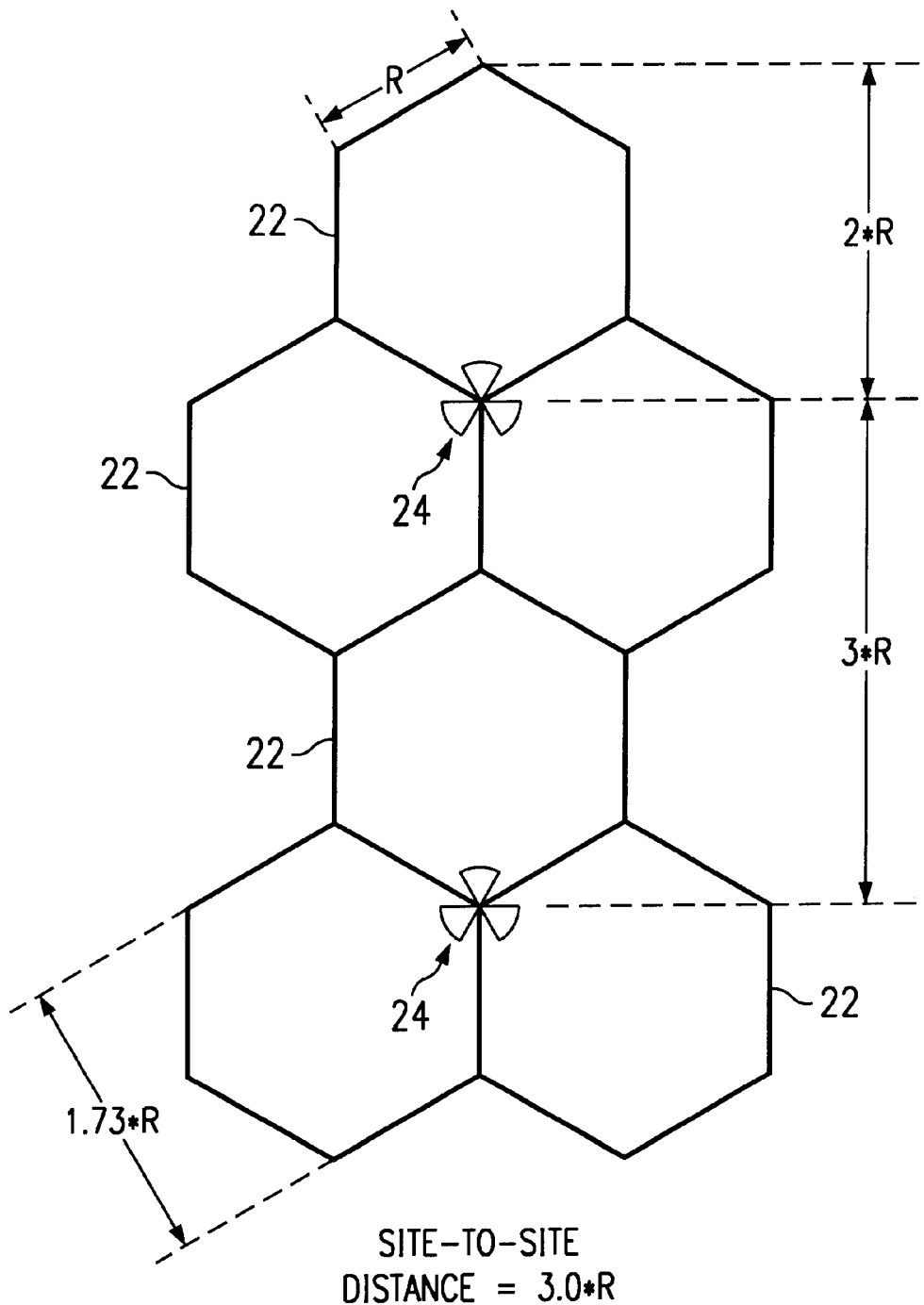
FIG. 3 is an illustration of a hexagonal grid pattern depicted as a clover leaf pattern, illustrating the relationship of the site-to-site distance in relation to the cell radius.

For purposes of illustration, the coverage areas of cell sites 12 can also form a clover leaf hexagonal grid as shown in FIG. 3 whereby each hexagon represents a cell or sector. In this embodiment, the cell sites 12 are located at the point where three hexagons 22 join, being shown at 24. The site i.e. BTS located at 24 services the three adjacent hexagon cells 22, as shown. In this instance, the site-to-site distance between sites 24 is calculated to be three times R. Here, since R represents the length of a side of the hexagon, the cell radius is 2 times R, as shown in FIG. 3. It is important to recognize that, given the site-to-site distance and cell radius relationship for any geometrical arrangement, and with one value known, the other value can be easily determined. Thus, knowing the average calculated site-to-site distance, the average calculated call radius can be determined knowing this relationship.

Referring again to Table 1, and for purposes of illustration, the system 10 shown in FIG. 1 is illustrated to be of the type shown in FIG. 2 whereby the hexagon grid pattern is formed of rhombic hexagons. The average calculated cell radius is shown in Table 1.

The next step in the process is to determine the most predominate grid size (radius) represented by the values in Table 1. Here, a 3.0 mile grid has been chosen as the baseline grid size. This was determined by adding the average calculated cell radii values, and dividing by the total number of values, and choosing the next highest or lowest whole number as desired. In this example, the aggregate average cell radius is 3.85 miles. In visually inspecting the assigned cell radii, a predominant number of the calculated cell radii have been assigned a value of 3.0 miles since most average cell radii are closer to 3.0 than to 4.0. The next smallest grid size down is defined as half of the baseline grid size, 1.5 miles. The next largest grid size is double the value of the baseline grid, or 6.0 miles. The next largest grid size up from a 6.0 mile grid is 12.0 miles.

The average cell radii, calculated and shown in Table 1, are then either rounded up or down to the nearest grid size. These assigned cell radii now represent the cell radii, rounded to the nearest whole number. It is easier to work with whole numbers or even increments of grid sizes, although this is not required in the present invention. As shown in Table 1, this has been accomplished with a smallest grid size being 1.5 miles and the largest grid size being 12 miles.

The 3.0 mile grid serves as the "anchor" for the other grid sizes. In other words, a 3.0 mile grid is overlaid onto the sites 12 having an assigned 3.0 mile radius to come up with a best fit. The other grids are then overlaid onto the 3.0 mile grid. By going through this process, the various cell layers are defined for the system 10. The composite of all the layers represented by the composite grid is shown at 28 in FIG. 4.

Figure 4:
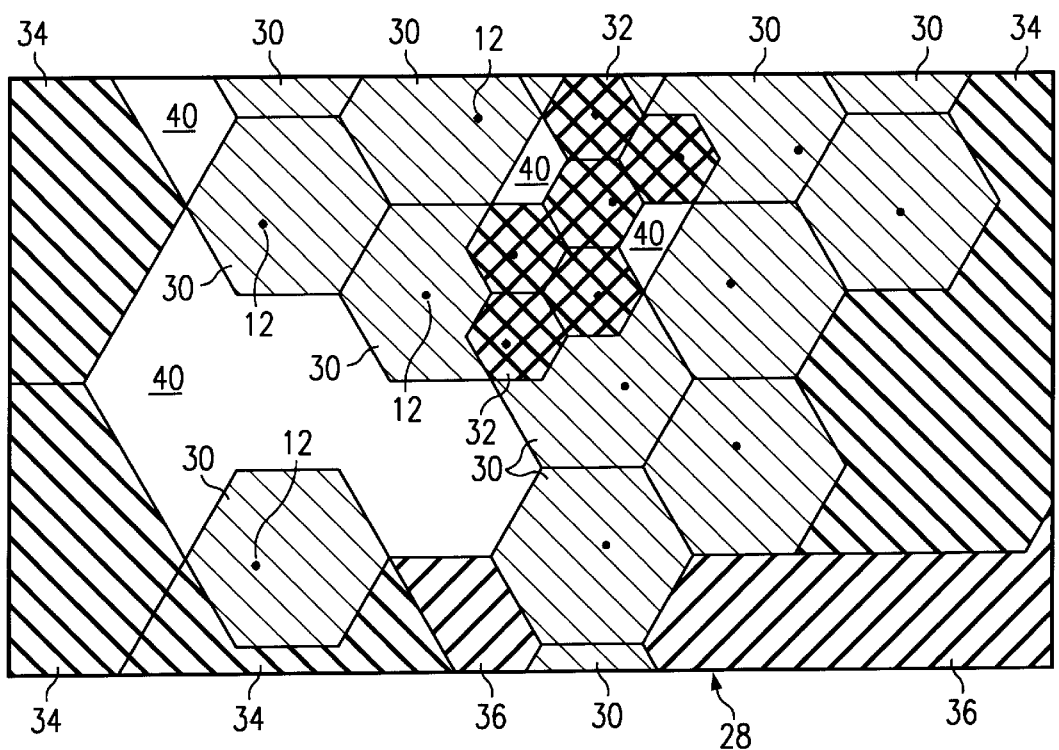
FIG. 4 is a composite of the cell layers (grids) displayed according to the present invention to identifying geographical areas requiring more detailed investigation.

Referring to FIG. 4, there is shown the 3.0 mile grid represented by hexagons 30. The 1.5 mile grid is illustrated by the hexagons 32. The 6.0 mile grid is illustrated as hexagons 34. The 12.0 mile grid is depicted by the hexagons 36.

The different grid layers depicted by the various hexagons are distinctively textured or shaded according to the size of the hexagons. Alternatively, the hexagons can be distinguished by having different colors if desired, or some other distinguishing symbology to help visually identify the different hexagons forming and associated with the different grid layers. Texturing is the preferred symbology for distinguishing the various hexagons in FIG. 4, although other symbology or coloring of the different hexagons could be performed and visually rendered to help identify the different grid layers.

Each of the grid layers are overlaid in association with the particular sites 12 according to a best-fit methodology to associate each hexagonal coverage area with each of the respective BTS sites 12, which are not necessarily geographically located in the centers of the hexagons in FIG. 4 as shown.

Referring to FIG. 4, the blank area identified at 40 indicates the area of the wireless system 10 that may have poor performance and coverage areas and may require further analysis.

The advantages of the composite display 28 shown in FIG. 4 is that all of the cell layers are visually displayed in readily identifiable grid sizes to help understand, appreciate and identify the various cell layers in the existing system 10 and provide a baseline for further analysis of poor performance problems.

Figure 5:
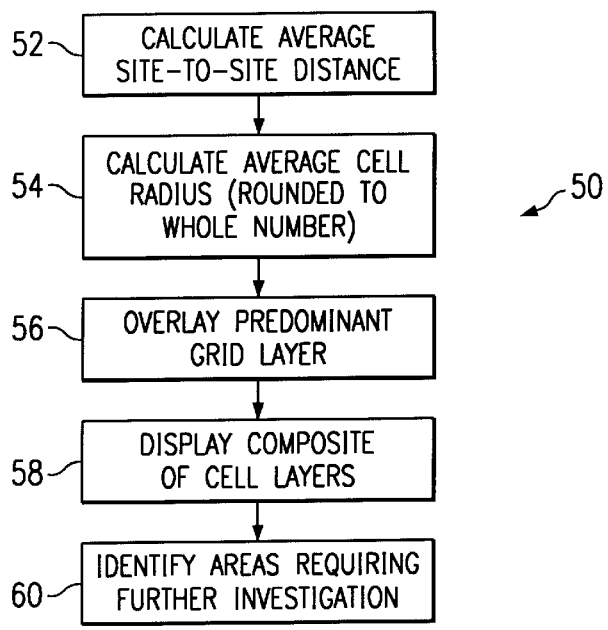
FIG. 5 is an algorithm for performing the methodology according to the present invention.

Referring now to FIG. 5, there is illustrated the methodology of the present invention depicted at 50. At step 52, the average site-to-site distance for each cell 12 in the system 10 is calculated, such as depicted in FIG. 1, and tabulated in Table 1.

Next, at step 54, the average cell radius is calculated based on the average site-to-site distance for each site to the nearest rounded whole number to establish a baseline grid size, which is 3.0 miles as depicted in the illustration and shown in Table 1.

Next, at step 56, the most predominant grid layer is identified from Table 1 and is overlaid with associated sites 12 and displayed, as depicted in FIG. 4.

Next, at step 58, a composite of the cell layers (grid sizes) is displayed including the smaller and larger grid sizes. The different cell layers are visually identified to help appreciate the different layers, such as by shading, texturing or by color.

Next, at step 60, areas of the cell system 10 requiring further investigation are visually identified by observing the blank areas not covered by one of the cell layers. This visually provides a baseline of the areas that need further analysis, such as road test.

Figure 6:
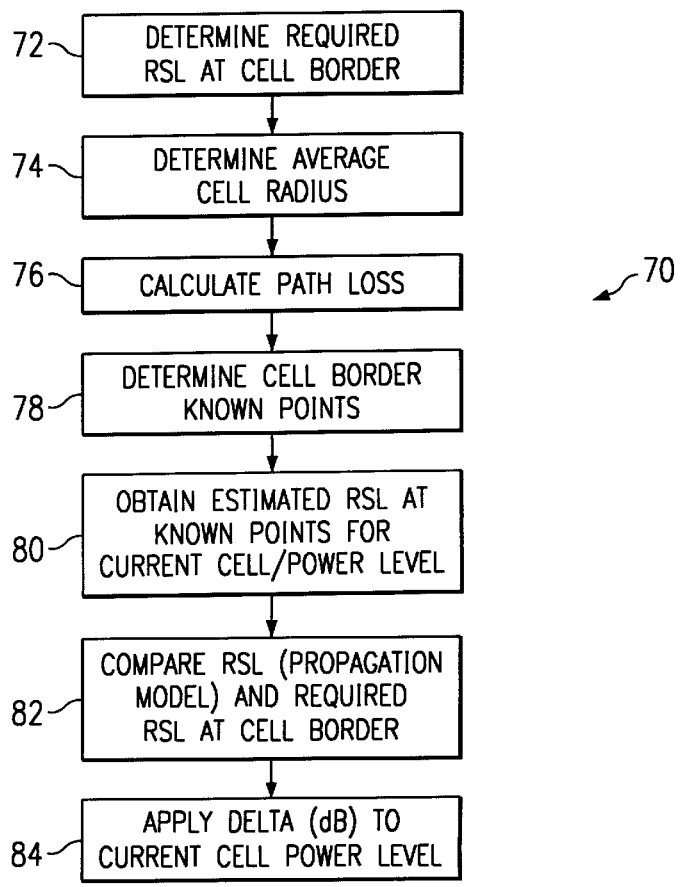
FIG. 6 is an algorithm for adjusting base station power levels.

To better optimize the communication system 10, the power levels of each of the transmitters associated with the different cell sites 12 can be accurately adjusted according to the method 70 of FIG. 6 to have an effective cell radius being the rounded average cell radius assigned and shown in Table 1.

At step 72, the required signal level (RSL) at the geographically determined cell border is determined, for example, −80 dBm.

At step 74, the average cell radius for the particular cell is determined as previously described with regards to FIG. 1 and illustrated in Table 1.

At step 76, knowing the current effected radiated power (ERP) of the respective transmitter, the average cell radius is utilized to calculate the path loss from the base station to any known points of interest along the cell border. This function is performed by the propagation prediction model via a standard path loss formula.

At step 78, particular known points along the cell border are determined, for example, the apexes of a hexagon cell.

At step 80, the estimated RSL at these known points for the current cell, at the current ERP level, are obtained directly from the propagation prediction model results in step 76.

At step 82, the obtained estimated RSL level, for the current ERP, at the known points along the cell border is compared to the desired signal planning level determined in step 72.

Next, at step 84, the delta between the estimated RSL from step 80 at the known points for the current cell ERP level is compared to the required RSL at the cell borders as established in step 72. Using the path loss formula, the delta is used to calculate a "new" ERP for the given average cell radius and desired RSL at the cell border. The cell border, as mentioned, is comprised of a number of known points as defined by the user.

Figure 7:
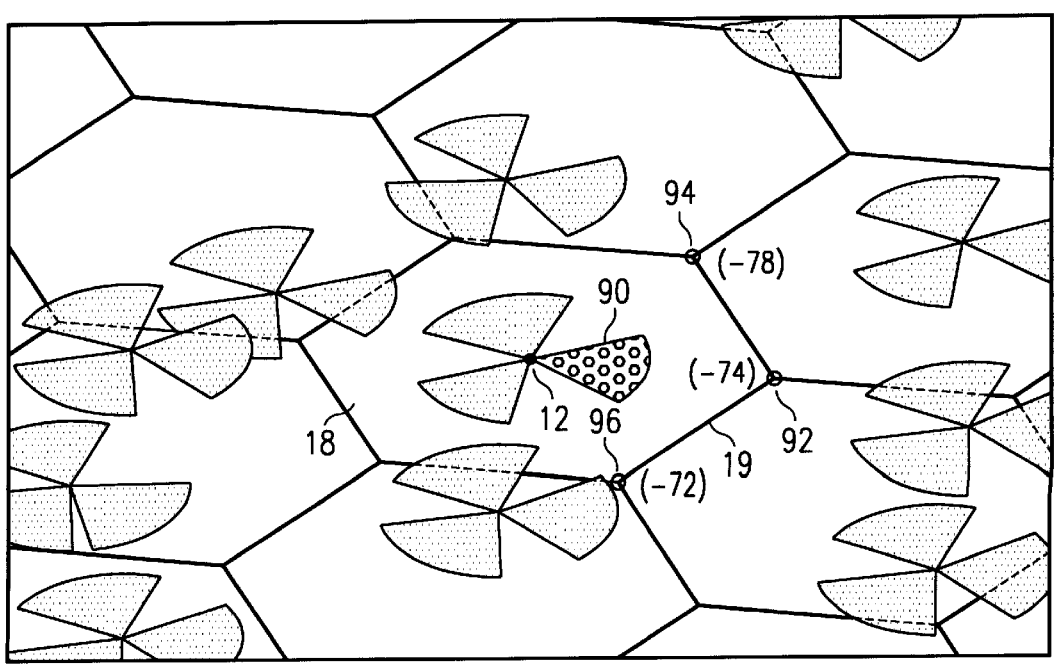
FIG. 7 is an illustration of expected power levels at selected points along a desired cell border.

To illustrate one implementation of the method 70 of FIG. 6, reference is made to FIG. 7. In FIG. 7, a number of sectored sites 18 similar to those of FIG. 2 are shown. The dark shaded sector 90 of the illustrated site 18 is the sector of interest where the power level is being evaluated. As shown, three known points represent the cell border 19, one point 92 being at the sector center line, and the other two points 94 and 96 being at the adjacent hexagonal grid intersection points to either side.

As illustrated, based on the propagation prediction model the expected RSL at point 92 is −74 dBm, whereby the expected RSL at point 94 is −78 dBm, and the expected RSL at point 96 is −72 dBm. These expected average RSL values are calculated using the current ERP of 38 dBm (6.3 watts) for a given average cell radius. The average expected RSL across the cell boundary 19 represented by the three geographically known points 92, 94 and 96 is −75 dBm. The desired average RSL at the cell border 19 is desired to be −80 dBm, as determined in step 72 of FIG. 6. Therefore, the current ERP of the transmitter at site 12 needs to be reduced by 5 dB. The revised ERP for the transmitter to lower the RSL at the border 19 by about 5 dB requires that the ERP of the transmitter be reduced to about 33 dBm (2 watts). In summary, the current expected RSL at the cell boundary of the cell having an assigned average cell radius is compared to the desired RSL at this cell boundary, whereby the ERP of the transmitter is increased or decreased such that the desired RSL at the cell border is expected at the cell border for the cell having the average cell radius.

The advantage of this methodology is that a quick and efficient method is established for determining the required power levels in the base station and the mobile station. This keeps the cells in the operating system fine-tuned as system growth occurs.

The wireless system 10 can be fine tuned such that the power level of the transmitters associated sites A-U are increased or decreased such that they have an effective cell radius corresponding to the assigned cell radius. Thus, the theoretical cell boundaries are adjusted to better interface with the boundaries of adjacent cells, and more accurately match with the desired grid layers depicted in FIG. 4. By adjusting the system 10 in this manner, system performance problems due to lack of coverage or interference based problems can be reduced.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A method of evaluating cell coverage of cells associated with sites comprising a wireless communication system, comprising the steps of:
   a) calculating an average site-to-site distance for each said site to neighboring sites;
   b) calculating an average cell radius for each said cell based on said average site-to-site distance associated with said respective cell; and
   c) displaying a composite of said cells on a display as a function of said average cell radii.

2. The method as specified in claim 1 further comprising the step of rounding said calculated average cell radii to a nearest one of a set of predetermined numbers.

3. The method as specified in claim 2 wherein said set of predetermined numbers are multiples of a predetermined number.

4. The method as specified in claim 1 further comprising the step of determining a most predominant average cell radius for the cells of the wireless communication system, and displaying a first grid layer on the display geographically associated with the cells associated with the most predominant average cell radius.

5. The method as specified in claim 4 further comprising the step of displaying on said display a second grid layer associated with the cells having an average cell radius associated with a second most predominant average cell radius.

6. The method as specified in claim 4 wherein said first grid layer is displayed using a best-fit approach in association with the cells having the most predominant average cell radius.

7. The method as specified in claim 5 wherein said second grid layer is displayed using a best-fit approach in association with the cells having the second most predominant average cell radius.

8. The method as specified in claim 5 further comprising the step of identifying areas of said wireless communications system requiring further investigation as a function of the displayed first grid layer and said second grid layer on the display.

9. The method as specified in claim 8 wherein said first grid layer and said second grid layer include hexagon symbology, each hexagon symbology being indicative of the coverage area for the respective cell in the cellular communications system.

10. The method as specified in claim 9 wherein said hexagons are distinctively shaded as a function of which grid layer they comprise.

11. A method of evaluating cell coverage of cells associated with sites comprising a wireless communication system, comprising the steps of:
    a) calculating an average site-to-site distance for each said site to neighboring sites;
    b) calculating an average cell radius for each cell based on said average site-to-site distance associated with said respective cell;
    d) determining the most predominant said average cell radius; and
    e) establishing a baseline grid based on said most predominant average cell radius.

12. The method as specified in claim 11 further comprising the step of performing a best-fit of said baseline grid to said sites having an average cell radius corresponding to said baseline grid and displaying said baseline grid in association with said sites.

13. The method as specified in claim 12 further comprising the step establishing said baseline grid as a whole number closest to said most predominant average cell radius.

14. The method as specified in claim 13 further comprising the step of establishing other grids being multiples of said baseline grid.

15. The method as specified in claim 14 further comprising the step of performing a best fit of said other grids to said sites have average cell radii corresponding to said respective other grid, and displaying said other grids simultaneously with said baseline grid.

16. The method as specified in claim 15 further comprising the step of distinctively identifying said baseline grid and said other grids with symbology.

17. The method as specified in claim 16 wherein said baseline grid and said other grids comprise hexagons.

18. The method as specified in claim 17 wherein said hexagons are textured as a function of grid size.

19. The method as specified in claim 17 wherein said hexagons are colored as a function of grid size.

20. The method as specified in claim 16 comprising the step of identifying areas of said cellular communications system requiring further investigation as a function of said displayed grids.

21. A method of adjusting a transmitter of a site in a wireless communication system having multiple sites, comprising the steps of:
    a) calculating an average site-to-site distance for said site to neighboring sites;
    b) calculating an average cell radius for said site based on said average site-to-site distance; and
    c) adjusting a power level of said transmitter as a function of said calculated average cell radius.

22. The method as specified in claim 21 wherein said power level is adjusted such that said adjusted power lever provides a predetermined received signal level (RSL) at a cell border defined by said average cell radius.

* * * * *